United States Patent
Sato

(10) Patent No.: US 7,907,231 B2
(45) Date of Patent: Mar. 15, 2011

(54) LIQUID CRYSTAL DISPLAY APPARATUS AND METHOD FOR GROUNDING LIQUID CRYSTAL DISPLAY APPARATUS

(75) Inventor: Akihide Sato, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 0 days.

(21) Appl. No.: 12/585,279

(22) Filed: Sep. 10, 2009

(65) Prior Publication Data

US 2010/0002168 A1 Jan. 7, 2010

Related U.S. Application Data

(62) Division of application No. 11/902,912, filed on Sep. 26, 2007.

(30) Foreign Application Priority Data

Sep. 27, 2006 (JP) .................................. 2006-262221

(51) Int. Cl.
*G02F 1/1333* (2006.01)
(52) U.S. Cl. .......................................... 349/58; 349/59
(58) Field of Classification Search ..................... 349/58, 349/59
See application file for complete search history.

(56) References Cited

U.S. PATENT DOCUMENTS

| 5,870,160 | A | * | 2/1999 | Yanagawa et al. | 349/141 |
| 6,034,757 | A | * | 3/2000 | Yanagawa et al. | 349/141 |
| 6,108,066 | A | * | 8/2000 | Yanagawa et al. | 349/141 |
| 6,525,786 | B1 | * | 2/2003 | Ono | 349/40 |
| 2004/0095335 | A1 | * | 5/2004 | Oh et al. | 345/173 |
| 2007/0030420 | A1 | * | 2/2007 | Jang | 349/96 |

FOREIGN PATENT DOCUMENTS

| JP | 11-109395 A | | 4/1999 |
| JP | 2004-355035 | | 12/2004 |
| KR | 2005064386 | * | 6/2005 |

OTHER PUBLICATIONS

Office Action in U.S. Appl. No. 11/902,912, dated Oct. 26, 2009.
Chinese Office Action dated Oct. 23, 2009 with English-language translation.

* cited by examiner

*Primary Examiner* — K. Cyrus Kianni
(74) *Attorney, Agent, or Firm* — McGinn IP Law Group, PLLC

(57) ABSTRACT

Disclosed is a liquid crystal display apparatus, including: a liquid crystal display panel; a polarizing plate which is processed to be conductive and is attached to a surface of the liquid crystal display panel; and a conductive frame, wherein the polarizing plate includes a projecting area which projects outward from the edge of the liquid crystal display panel, and wherein the conductive frame presses the projecting area of the polarizing plate in order to ground the polarizing plate. A method for grounding a liquid crystal display apparatus is also disclosed.

10 Claims, 4 Drawing Sheets

LIQUID CRYSTAL DISPLAY APPARATUS AND METHOD FOR GROUNDING LIQUID CRYSTAL DISPLAY APPARATUS

The present Application is a Divisional Application of U.S. patent application Ser. No. 11/902,912, filed on Sep. 26, 2007.

RELATED APPLICATIONS

This application is based upon and claims the benefit of priority from Japanese patent application No. 2006-262221, filed on Sep. 27, 2006, the disclosure of which is incorporated herein in its entirety by reference.

BACKGROUND OF THE INVENTION

1. Field of the Invention

The present invention relates to a liquid crystal display apparatus and a method for grounding the liquid crystal display apparatus.

2. Description of the Related Art

Generally, a liquid crystal display apparatus includes a liquid crystal display panel, a backlight unit and a chassis (case). The backlight unit is arranged at a back face of the liquid crystal display panel. The liquid crystal display apparatus includes a structure in which the liquid crystal display panel integrated with the backlight unit is installed in a metallic frame (i.e. the chassis).

The liquid crystal display panel includes a liquid crystal driving circuit substrate, an opposite substrate, a sealing member and a liquid crystal material. The liquid crystal driving circuit substrate and the opposite substrate are oppositely arranged with a gap therebetween which is formed by the sealing member. The liquid crystal material is disposed in the gap to form the liquid crystal display panel. The liquid crystal driving circuit substrate includes a liquid crystal driving circuit on a surface thereof (the inner surface) which contacts the liquid crystal material.

Some opposite substrates of the liquid crystal display panels do not include a conductor on surfaces thereof. That is, such opposite substrate is not connected electrically anywhere and consequently, is in an electrically floating state. For example, a liquid crystal display apparatus of a normally black mode type according to IPS (In-Plane Switching) method includes the opposite substrate above mentioned.

A polarizing plate including a conductor on a surface thereof thereon is attached to a surface of the opposite substrate in the electrically floating state in order to discharge an electric charge (i.e. static electricity) on the opposite substrate. The opposite substrate is grounded (GND) when the conductor mounted on the surface of the polarizing plate contacts the metallic frame.

In such liquid crystal display panel, the polarizing plate at the opposite substrate side is smaller than an external shape of the liquid crystal display panel. Therefore, the conductor for grounding is pressed physically by the metallic frame against the polarizing plate arranged on a surface of the liquid crystal display panel. As a result, a stress is applied to the liquid crystal display panel, and consequently, the stress causes an uneven image on a screen.

Methods for grounding from the surface of the polarizing plate at the opposite substrate side according to a related art will be described in FIG. 3 to FIG. 7. Japanese Patent Application Laid-Open No. 2004-355035 (Japanese Patent Application No. 2004-270865) discloses a liquid crystal display apparatus having a structure for grounding the opposite substrate mentioned above. FIG. 3 is a cross sectional view showing the disclosed liquid crystal display apparatus. FIG. 4 is a cross sectional view showing a structure of the polarizing plate shown in FIG. 3. FIG. 5 is a fragmentary cross sectional view showing details of the liquid crystal display panel shown in FIG. 3.

The liquid crystal display apparatus shown in FIG. 3 includes a liquid crystal material 11, an upper polarizing plate 13b, a conductor 16a, a metallic frame 180, a lower polarizing plate 15a, a backlight unit 19 and a printed wiring board 21. The conductor 16a includes, for example, a conductive rubber and forms electrical connection between the upper polarizing plate 13b and the metallic frame 180.

As shown in FIG. 4, the upper polarizing plate 13b includes a three-layered structure having an optical polarizing layer 131, a conductive layer 132 and an antireflection layer 133. Both-sided adhesive tapes formed on both sides of the conductor 16a bond the upper polarizing plate 13b and the conductor 16a and bond the metallic frame 180 and the conductor 16a. The conductive layer 132 is, for example, an ITO (Indium Tin Oxide) film formed with the sputtering method. A film made of SiO2 is formed as the antireflection layer 133 on the surface of the conductive layer 132 for protection thereof.

An opposite substrate 12 and an opposite substrate side polarizing plate 13a shown in FIG. 5 correspond to the upper polarizing plate 13b shown in FIG. 3. A liquid crystal driving circuit substrate 14 and a liquid crystal driving circuit side polarizing plate 15b shown in FIG. 5 correspond to the lower polarizing plate 15a shown in FIG. 3. The liquid crystal display panel has a structure that the liquid crystal driving circuit substrate 14 and the opposite substrate 12 are oppositely arranged with a predetermined gap and are sealed by a sealing member 17. The liquid crystal material 11 is disposed in the gap therebetween. The polarizing plate 13a at the opposite substrate side is adhered to a front surface (i.e. a display surface side) of the liquid crystal display panel. The polarizing plate 15a at the liquid crystal driving circuit side is adhered to a rear surface of the liquid crystal display panel.

According to the structure shown in FIG. 5, when the metallic frame 180 presses the conductor 16a against the polarizing plate 13a at the opposite substrate side arranged on the surface of the liquid crystal display panel, an electrical grounding is secured. However, stress is applied to the liquid crystal display panel, and consequently, an uneven image on a screen due to the stress is generated. If the stress is made so small that the uneven images do not occur, the electric resistance between the polarizing plate 13a at the surface of the opposite substrate side and the metallic frame 180 via the conductor 16a becomes large. As a result, the electric charge can not be discharged sufficiently.

FIG. 6 is a fragmentary cross sectional view showing other liquid crystal display apparatus disclosed in Japanese Patent Application Laid-Open No. 2004-355035. According to the disclosed structure, the metallic frame 180 and the polarizing plate 13a at the opposite substrate side are connected electrically each other through a conductive tape 20, instead of the conductor 16a. In this case, since the conductive tape 20 is adhered to the surface of the polarizing plate 13a at the opposite substrate side, the electric charge can be discharged to the metallic frame 180 without the stress originated with the metallic frame 180 which is applied to the surface of the liquid crystal display panel. However, according to the structure, when the liquid crystal display panel and the backlight unit 19 are installed in the metallic frame 180, it becomes necessary to perform a step for adhering the conductive tape 20 which is an extra process. As a result, production cost of the liquid crystal display apparatus increases due to the additive step in the assembly process of the apparatus.

FIG. 7 is a fragmentary cross sectional view showing further other liquid crystal display apparatus disclosed in Japanese Patent Application Laid-Open No. 2004-355035. According to the apparatus, a conductive tape 20a is used. Here, the conductive tape 20a is adhered to a metal part 22 of the backlight unit 19 instead of the metallic frame 180. Accordingly, the apparatus includes the same difficulty as the apparatus shown in FIG. 6.

SUMMARY OF THE INVENTION

The present invention has been proposed in view of the above mentioned circumstances. The object of the present invention is to provide a liquid crystal display apparatus in which a stress is not applied to a liquid crystal display panel and an uneven image does not occur, even if a strong contact is made on a surface of a polarizing plate for connection to the ground, and to provide a method for grounding the liquid crystal display apparatus.

The present invention provides a liquid crystal display apparatus, including: a liquid crystal display panel; a polarizing plate which is processed to be conductive and is attached to a surface of the liquid crystal display panel; and a conductive frame, wherein the polarizing plate includes a projecting area which projects outward from the edge of the liquid crystal display panel, and wherein the conductive frame presses the projecting area of the polarizing plate in order to ground the polarizing plate.

Further, the present invention provides a method for grounding a liquid crystal display apparatus including a liquid crystal display panel, a polarizing plate which is processed to be conductive, and a conductive frame, the method including: attaching the polarizing plate to a surface of the liquid crystal display panel so that the polarizing plate includes a projecting area which projects outward from the edge of the liquid crystal display panel; and grounding the polarizing plate through the conductive frame which presses a surface of the projecting area of the polarizing plate.

BRIEF DESCRIPTION OF THE DRAWINGS

Exemplary features and advantages of the present invention will become apparent from the following detailed description when taken with the accompanying drawings in which.

DESCRIPTION OF THE EXEMPLARY EMBODIMENTS

Exemplary embodiments of the present invention will now be described in detail in accordance with the accompanying drawings.

First Exemplary Embodiment

Figure 1:
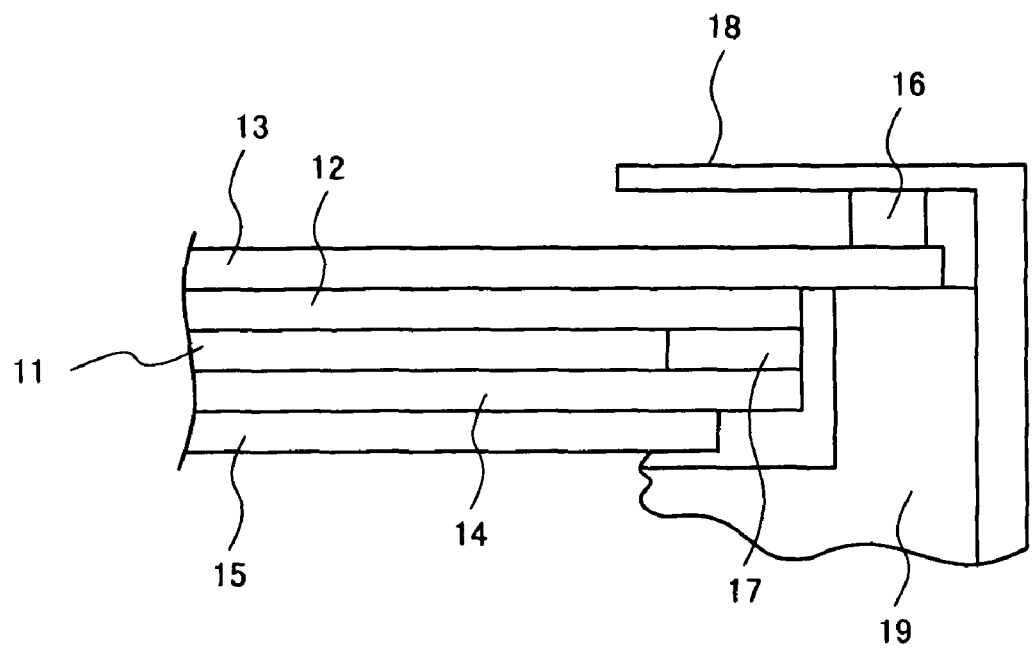
FIG. 1 is a fragmentary cross sectional view showing a first exemplary embodiment of the present invention.

FIG. 1 is a cross sectional view of a part of a liquid crystal display apparatus according to a first exemplary embodiment of the present invention. As shown in FIG. 1, the liquid crystal display apparatus according to the embodiment includes a liquid crystal material 11, an opposite substrate 12, a polarizing plate 13 at an opposite substrate side, a liquid crystal driving circuit substrate 14, a polarizing plate 15 at a liquid crystal driving circuit side, a conductor 16, a sealing member 17, a metallic frame 18 and a backlight unit 19.

The liquid crystal driving circuit substrate 14 and the opposite substrate 12 are oppositely disposed each other by the sealing member 17 so that a gap is formed therebetween. The liquid crystal material 11 is put into the gap to form the liquid crystal display panel. A liquid crystal driving circuit is mounted on an inner surface of the liquid crystal driving circuit substrate 14, which contacts the liquid crystal material 11. The opposite substrate 12 does not include a conductive layer over a surface thereof and then is electrically floated. Since the opposite substrate 12 tends to be influenced by an electric charge (i.e. static electricity), the polarizing plate 13 at the opposite substrate side whose surface includes a conductive layer is attached or adhered to an outer surface of the opposite substrate 12.

In the exemplary embodiment, the polarizing plate 13 at the opposite substrate side is larger than an external shape of the liquid crystal display panel (that is, the size of the external shape of the opposite substrate 12 and the liquid crystal driving circuit substrate 14). That is, when the polarizing plate 13 at the opposite substrate side is attached or adhered to a surface of the opposite substrate 12, a part of the polarizing plate 13 projects outward from the edge of the liquid crystal display panel (i.e., a projecting area). Moreover, the surface of the projecting area of the polarizing plate 13, which is processed to be conductive, is electrically connected to the metallic frame 18 via the conductor 16. As a result, the opposite substrate 12 is grounded (GND) via the metallic frame 18 and an electric charge thereon are discharged. Further, the polarizing plate 15 at the liquid crystal driving circuit side is attached to an outer surface of the liquid crystal driving circuit substrate 14.

The exemplary embodiment includes following features compared with the related art shown in FIG. 3 to FIG. 7.

(1) the polarizing plate 13 at the opposite substrate side includes a part or area which projects outward from the edge of the external shape of the liquid crystal display panel.

(2) the electric connection to the ground is secured through the projecting area or part of the polarizing plate 13 which is pressed physically via the conductor 16 by the metallic frame 18.

There are many methods to connect electrically to the surface of the polarizing plate 13 at the opposite substrate side for grounding. However, when the conductor 16 is pressed to the polarizing plate 13, the stress due to the press is applied to the opposite substrate 12 which is one of elements of the display panel. Consequently, uneven image is generated on a screen. In particular, in the liquid crystal display apparatus of a normally black mode type according to IPS (In-Plane Switching) method, a white spot as unevenness occurs on a black screen. The unevenness on a screen may be generated by a small stress. If the stress to the polarizing plate 13 at the opposite substrate side is reduced in order to avoid generation of the unevenness on a screen, the electric connection to the ground becomes insufficient.

According to the exemplary embodiment, a part of the polarizing plate 13 at the opposite substrate side projects outward from the edge of the liquid crystal display panel. Moreover, the conductor 16 for grounding presses the projecting area of the polarizing plate 13 which is located on an upper part of the backlight unit 19. Accordingly, although the stress is applied to the projecting area of the polarizing plate 13 at the opposite substrate side, the stress is not applied to the screen (i.e. the opposite substrate 12) of the liquid crystal display panel. Accordingly, it is possible to display an excellent image without the unevenness, since the liquid crystal display panel is free from stress and the electric connection for grounding can be secured sufficiently.

Next, a method for manufacturing the liquid crystal display apparatus shown in FIG. 1 will be described. First, the liquid crystal driving circuit substrate 14 and the opposite substrate 12 are oppositely disposed, via the sealing member 17, with a predetermined gap therebetween. The gap is filled with the liquid crystal material 11 and is sealed by the sealing member 17 to form the liquid crystal display panel. Next, the polarizing plate 13 is attached to an outer surface of the opposite substrate 12 in the display panel. Also, the polarizing plate 15 is attached to an outer surface of the liquid crystal driving circuit substrate 14. An outer surface of the polarizing plate 13, which does not contact the opposite substrate 12, is processed to be conductive so that an electric charge on the display panel can be discharged. The process for forming conductivity may include a method of vapor deposition of conductor, such as transparent metal, on the polarizing plate 13, and a method of applying transparent resin including metallic fillers to the polarizing plate 13.

When the liquid crystal display apparatus is assembled, the conductor 16 is mounted on the metallic frame 18 so that the conductor 16 can connect the conductive projecting area of the polarizing plate 13. The polarizing plate 13 and the metallic frame 18 are electrically connected and fixed each other via the conductor 16, for example, with a double-faced adhesive tape, an adhesive or the like, each of which is electrically conductive. As a result, electric connection between the polarizing plate 13 and the metallic frame 18 which is connected to the ground (GND) can be secured. The metallic frame 18 can be made of metal such as stainless steel. The conductor 16 can be metallic spring, electrically conductive rubber or the like. Further, the metallic frame 18 may be made of material other than metal. That is, a conductive frame whose conductivity can secure the electric connection to the ground may be employed as the substitution of the metallic frame 18.

Second Exemplary Embodiment

Figure 2:
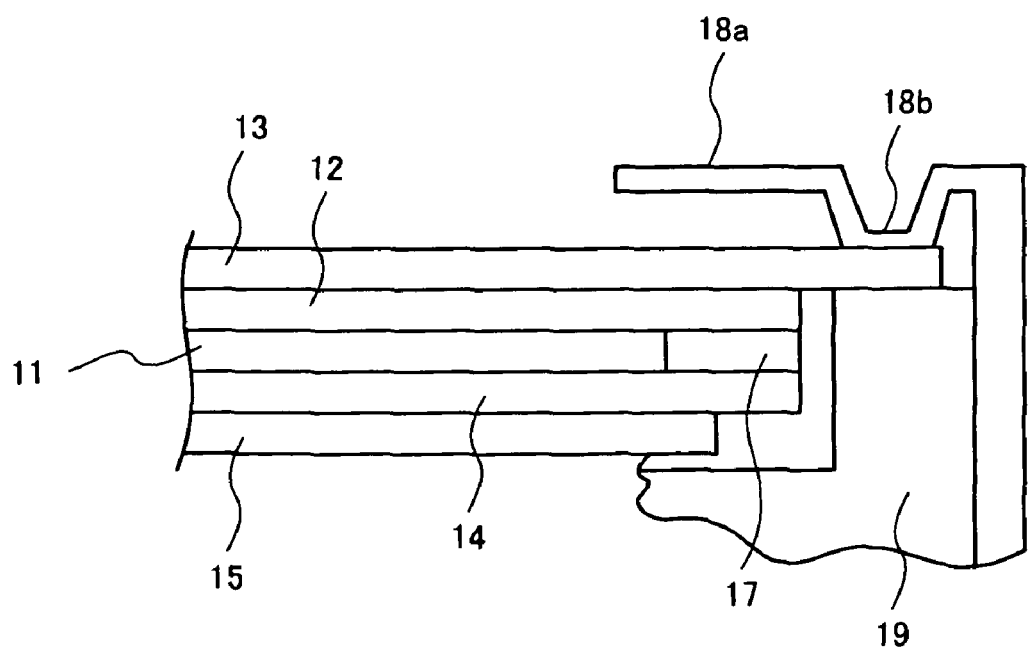
FIG. 2 is a fragmentary cross sectional view showing a second exemplary embodiment of the present invention.
Figure 3:
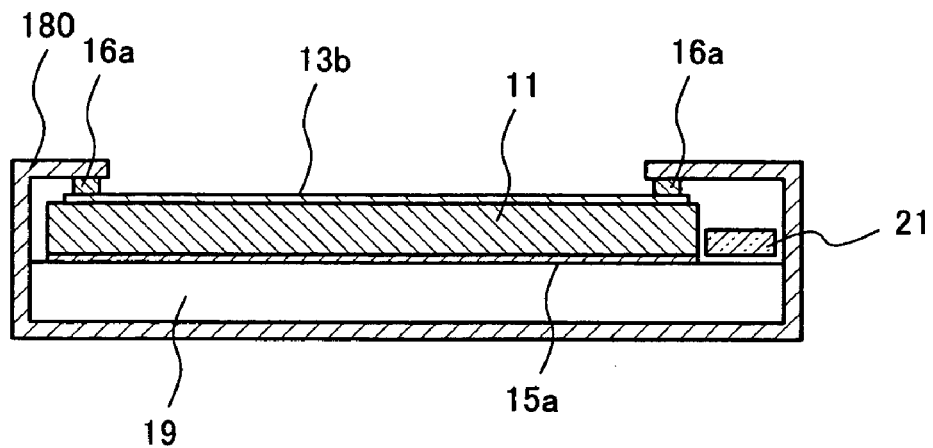
FIG. 3 is a cross sectional view showing a related art of a liquid crystal display apparatus.
Figure 4:
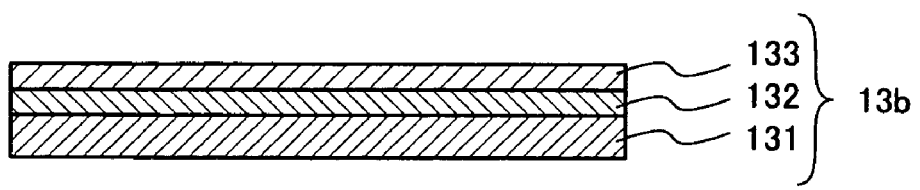
FIG. 4 is a cross sectional view showing a structure of the polarizing plate shown in FIG. 3.
Figure 5:
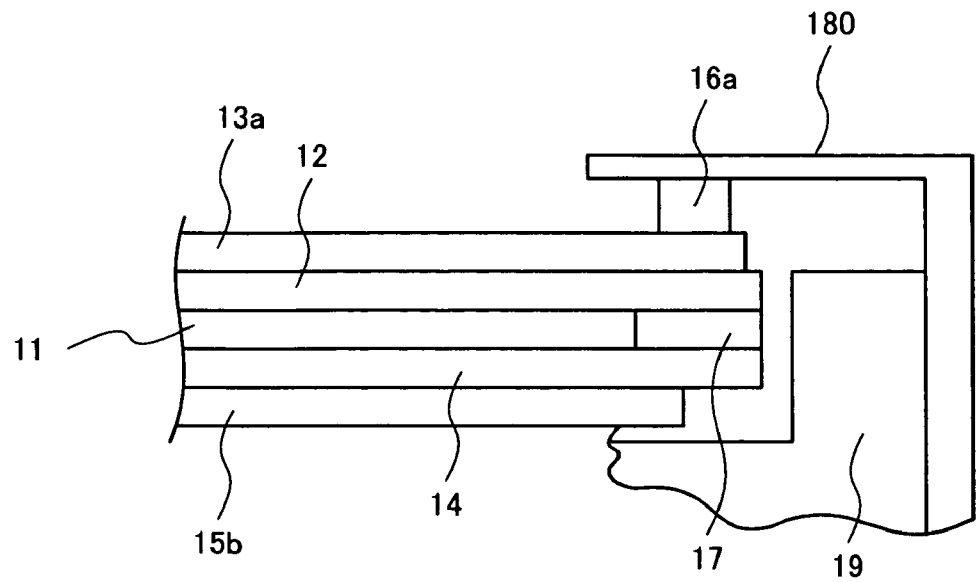
FIG. 5 is a fragmentary cross sectional view showing details of the liquid crystal display panel shown in FIG. 3.
Figure 6:
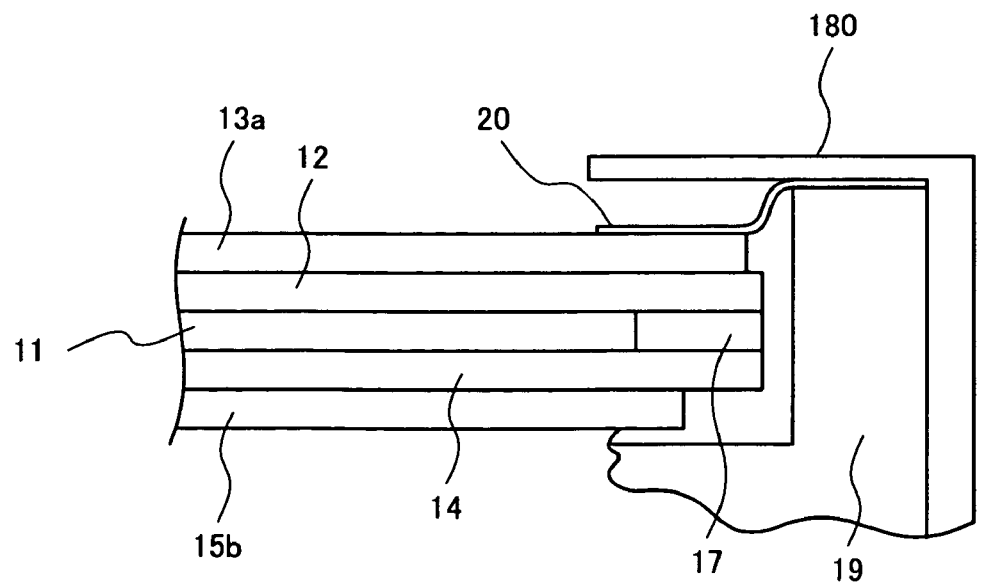
FIG. 6 is a fragmentary cross sectional view showing other related art of the liquid crystal display apparatus.
Figure 7:
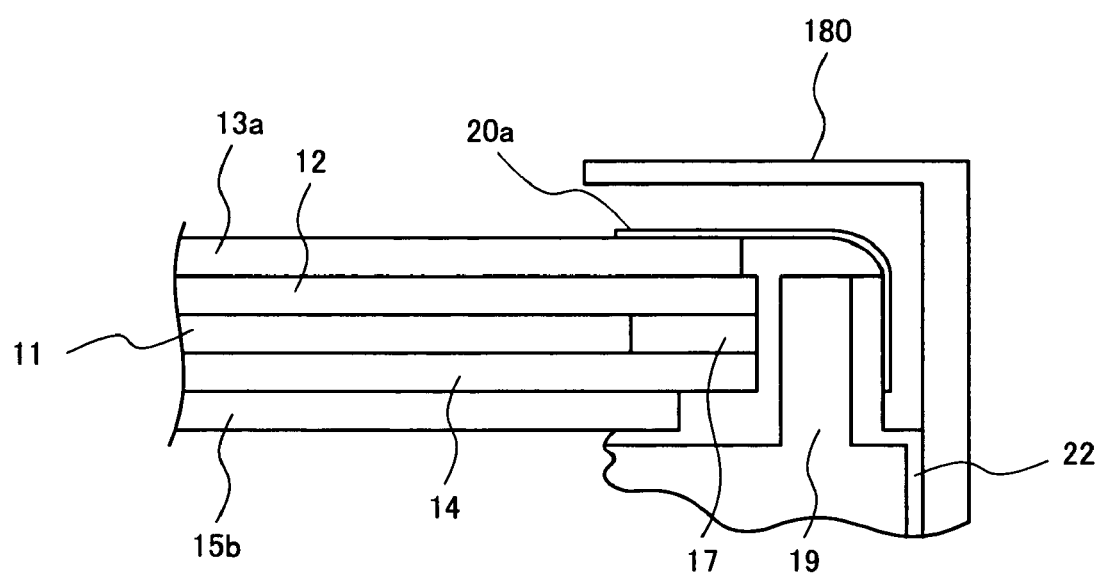
FIG. 7 is a fragmentary cross sectional view showing further other related art of the liquid crystal display apparatus.

Next, a second exemplary embodiment of the present invention will be described with reference to drawings. FIG. 2 is a cross sectional view of a part of a liquid crystal display apparatus according to the second exemplary embodiment of the present invention. The conductor 16 shown in FIG. 1 is not used in FIG. 2. In FIG. 2, a metallic frame 18a includes an elastic contact part 18b which is formed to be convex toward the projecting area of the polarizing plate 13 through processing the metallic frame 18a. The contact part 18b touches and presses the projecting area of the polarizing plate 13 to make electric contact therewith. The contact part 18b of the metallic frame 18a can be processed with various methods such as bending work and press work.

Electric connection between the metallic frame 18a and the polarizing plate 13 can be formed by strong contact between the contact part 18b and the projecting area of the polarizing plate 13. Moreover, uneven image on a screen due to stress applied to the liquid crystal display panel is not generated, because the stress is not applied to the panel. Further, the metallic frame 18a according to the exemplary embodiment may be made of a conductive frame other than metal. A number of components and cost thereof can be reduced in the second embodiment, compared with the first embodiment, since it is unnecessary to use the conductor 16 mounted on the metallic frame 18a.

As described above, according to the exemplary embodiments of the present invention, the part of the polarizing plate which is adhered to the surface of the liquid crystal display panel projects outward from the external shape of the display panel. The projecting area of the polarizing plate 13 is pressed from the conductive frame to make electric contact for grounding. Therefore, uneven image on a screen is not generated, since no stress is applied to the liquid crystal display panel even though the conductive frame strongly presses the polarizing plate to make electric contact for grounding.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A liquid crystal display apparatus, comprising:
 a liquid crystal display panel, comprising:
   a liquid crystal driving circuit substrate;
   a sealing member and a liquid crystal material disposed on an upper surface of the liquid crystal driving circuit substrate; and
   an opposite substrate disposed on an upper surface of the sealing member and an upper surface of the liquid crystal material;
 a polarizing plate which is conductive and is attached to a surface of the liquid crystal display panel; and
 a conductive frame,
 wherein the polarizing plate includes a projecting area which projects outward from an edge of the opposite substrate, and
 wherein the conductive frame presses the projecting area of the polarizing plate in order to ground the polarizing plate.

2. The liquid crystal display apparatus according to claim 1, wherein the conductive frame includes an elastic contact part, which touches the polarizing plate in order to ground the polarizing plate.

3. The liquid crystal display apparatus according to claim 1, wherein the liquid crystal display panel comprises a black mode type liquid crystal display panel.

4. The liquid crystal display apparatus according to claim 1, wherein the conductive frame comprises an elastic contact part that contacts with the projecting area of the polarizing plate to ground the polarizing plate.

5. The liquid crystal display apparatus according to claim 1, wherein the conductive frame comprises an elastic contact part that contacts with the polarizing plate, a contact area of the elastic contact part with the polarizing plate being confined within the projection area.

6. The liquid crystal display apparatus according to claim 1, wherein the polarizing plate is attached to an upper surface of the liquid crystal display panel.

7. The liquid crystal display apparatus according to claim 1, wherein the projecting area projects outward from an edge of the opposite substrate in a lateral direction of extension of the liquid crystal display panel.

8. The liquid crystal display apparatus according to claim 1, wherein the liquid crystal driving circuit substrate and the opposite substrate are formed on opposite sides of the liquid crystal material.

9. The liquid crystal display apparatus according to claim 1, wherein the polarizing plate is attached to an upper surface of the opposite substrate.

10. The liquid crystal display apparatus according to claim 1, further comprising:
a backlight unit placed on a side of the sealing member, the projecting area of the polarizing plate being located above the backlight unit.

* * * * *